(12) United States Patent
Kraft

(10) Patent No.: US 9,153,039 B2
(45) Date of Patent: Oct. 6, 2015

(54) METHOD FOR REDUCING AND COMPRESSING RAW DETECTOR DATA TO BE TRANSMITTED OF A QUANTA-COUNTING DETECTOR, DETECTOR TRANSMISSION PATH AND CT SYSTEM

(71) Applicant: Edgar Kraft, Forchheim (DE)

(72) Inventor: Edgar Kraft, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 258 days.

(21) Appl. No.: 13/802,947

(22) Filed: Mar. 14, 2013

(65) Prior Publication Data

US 2013/0251220 A1 Sep. 26, 2013

(30) Foreign Application Priority Data

Mar. 26, 2012 (DE) .......................... 10 2012 204 775

(51) Int. Cl.
G06T 9/00 (2006.01)
G06T 11/00 (2006.01)
G06K 9/62 (2006.01)

(52) U.S. Cl.
CPC ................ *G06T 9/004* (2013.01); *G06K 9/624* (2013.01); *G06T 9/00* (2013.01); *G06T 11/003* (2013.01); *G06T 2211/408* (2013.01)

(58) Field of Classification Search
USPC ................................................. 382/131, 232
See application file for complete search history.

(56) References Cited

U.S. PATENT DOCUMENTS

| 7,844,097 | B2 * | 11/2010 | Wegener .................... 382/131 |
| 7,852,977 | B2 * | 12/2010 | Wegener et al. ............... 378/4 |
| 7,916,830 | B2 * | 3/2011 | Wegener et al. ............. 378/19 |
| 8,045,811 | B2 * | 10/2011 | Wegener et al. ............ 382/232 |
| 2006/0081785 | A1 * | 4/2006 | Heismann et al. ....... 250/370.09 |
| 2008/0292168 | A1 * | 11/2008 | Winkelmann ............... 382/131 |
| 2009/0310736 | A1 * | 12/2009 | Ziegler et al. .................. 378/5 |
| 2012/0281896 | A1 * | 11/2012 | Aspelmeier et al. ......... 382/131 |

FOREIGN PATENT DOCUMENTS

| CN | 1750786 A | 3/2006 |
| CN | 101578535 A | 11/2009 |

(Continued)

OTHER PUBLICATIONS

Hauptkomponentenanalyse, Mar. 25, 2012, Wikipedia (online) http://de.wikipedia.org/w/index.php?title=Hauptkomponentenanalyse&oldid=101287827.

(Continued)

*Primary Examiner* — Utpal Shah
(74) *Attorney, Agent, or Firm* — Harness, Dickey & Pierce, P.L.C.

(57) ABSTRACT

A method is disclosed for reducing and compressing raw detector data to be transmitted of a quanta-counting detector. Count patterns are determined in the raw detector data, encoded with a reduced bit depth by comparison with the raw detector data, and the encoded count patterns are transmitted and decoded following the transmission. A data transmission path between a quanta-counting detector and a computer system is further disclosed, wherein program segments/modules are provided, which execute the afore-cited method steps during operation. Further, a CT system including such a data transmission path is also disclosed.

31 Claims, 5 Drawing Sheets

(56) References Cited

FOREIGN PATENT DOCUMENTS

| DE | 102007018324 B3 | 6/2008 |
|---|---|---|
| WO | WO 2004071299 A1 | 8/2004 |

OTHER PUBLICATIONS

Informationsgehalt eines Röntgenbildes und Dosis, Ewen, K; Ewen, K; Informationsgehalt eines Röntgenbildes und Dosis, In: Forum—Röntgenverordnung; http://www.forum-roev.de/download/Informationsgehalt_eines_Roentgenbildes_und_Dosis.pdf, Jan. 2010.

Globale Kommunikation: "Dynamische Anpassung der Bandbreite von Multimediadiensten an Netzwerkübegängen"; Pressemitteilung der Fraunhofer Gesellschaft vom Aug. 3, 2005; verfügbar unter: http://www-pressrelations.de/new/standard/result_main.cfm?r=199647&sid=&aktion=jour_pm&print=l&pdf=1, 2005.

Quad-Tree-Baumstruktur; http://en.wikipedia.org/wiki/File:Quad_tree_bitmap.svg, 2013.

Chinese Office Action and English translation thereof dated Dec. 10, 2014.

\* cited by examiner

FIG 1
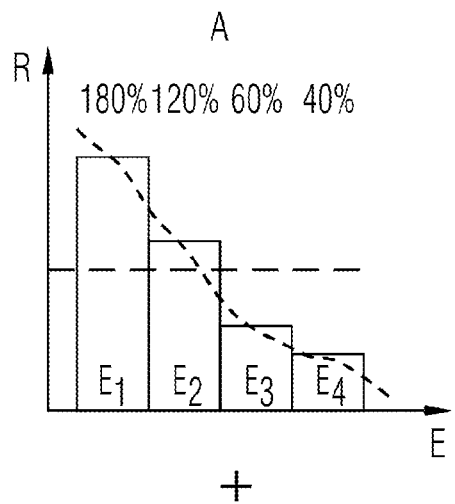
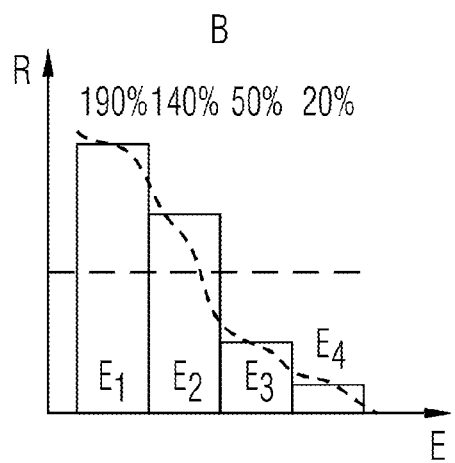
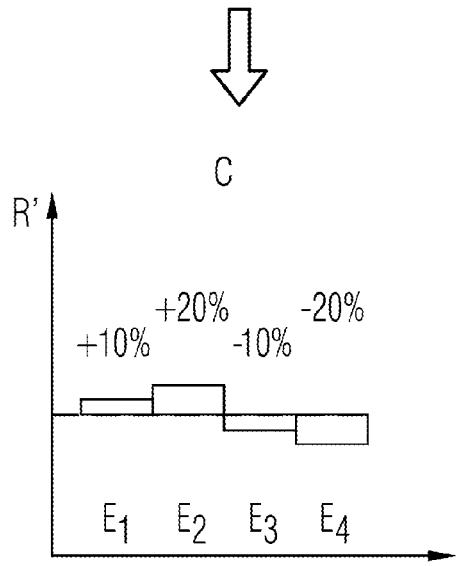
FIG 2
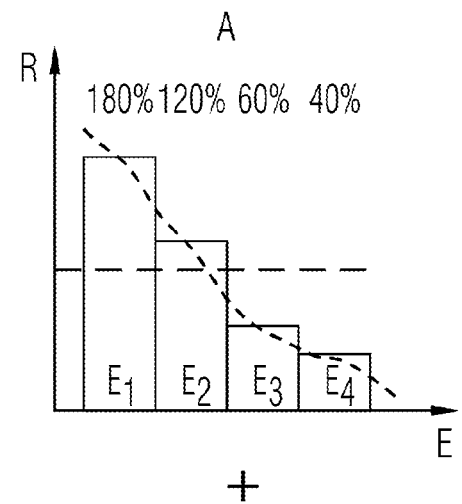
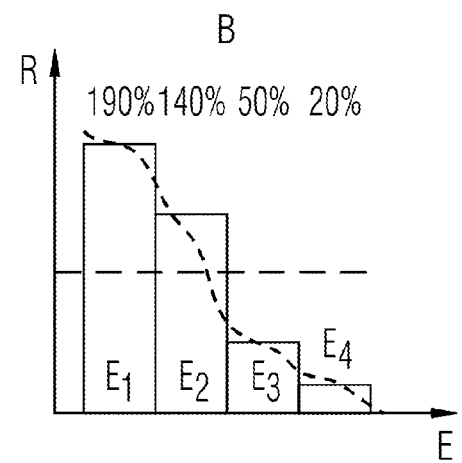
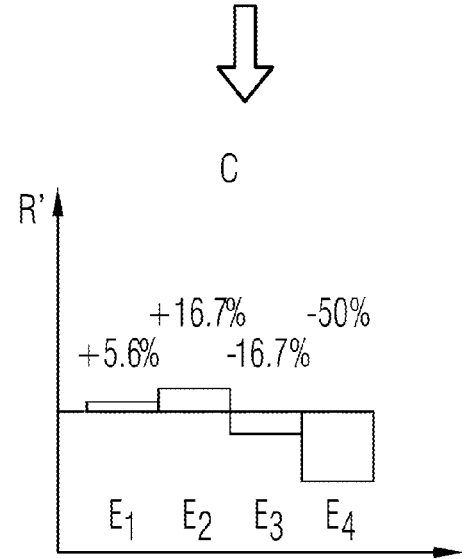

METHOD FOR REDUCING AND COMPRESSING RAW DETECTOR DATA TO BE TRANSMITTED OF A QUANTA-COUNTING DETECTOR, DETECTOR TRANSMISSION PATH AND CT SYSTEM

PRIORITY STATEMENT

The present application hereby claims priority under 35 U.S.C. §119 to German patent application number DE 10 2012 204 775.1 filed Mar. 26, 2012, the entire contents of which are hereby incorporated herein by reference.

FIELD

At least one embodiment of the invention generally relates to a method for reducing and compressing raw detector data of a quanta-counting detector having a plurality of detector pixels, each of which is subdivided into several sub detector pixels and per sub detector pixel, at least two different energy thresholds are used to resolve the energy of the incident quanta to be counted. Furthermore, at least one embodiment of the invention also generally relates to a data transmission path between a quanta-counting detector and a computing system including a CT system with such a data transmission path.

BACKGROUND

With quanta-counting x-ray detectors, signal processing channels are often used, which determine the counting rate with different energy thresholds. As a result, a measurement of the x-ray signal is not only described by an individual value per channel, but instead by a value for each energy threshold. With similar spatial resolution (pixel dimension) and with N energy thresholds, this usually results in N-times the data quantity. The data quantity per energy threshold barely changes since the dynamic range remains approximately the same in each instance.

In x-ray applications with a high photon flow, in particular in the field of computed tomography (CT), there is also an increasing problem of the counting rate per pixel having to be kept as small as possible in order to avoid overlaying the individual pulses ("pulse pile-up") and thus reducing the count efficiency. The surface of the pixel is therefore often segmented into M sub detector pixels so that the flow per sub detector pixel reduces to 1/M. However this results in a further increase in the data volume approximately by the factor M. Overall, with the same spatial resolution and same surface, the (raw) data volume therefore increases approximately by the factor M*N compared with an integrating detector in the CT.

In more precise terms, this means: since the surface of the pixel reduces, the dynamic range required per channel is also smaller by the factor 1/M, so that compared with the non-segmented pixel, the required data width per channel can be reduced by log 2(M) bits. If a pixel is subdivided, subsequently referred to as "macropixel", into 4×4 sub detector pixels for instance, each sub detector pixel sees approximately one sixteenth of the flow so that the data width of the measured value can be reduced by 4 bits compared with the non-segmented pixel. The dynamic region of a 16-times segmented pixel with 16 bit per sub detector pixel therefore corresponds approximately to that of a non-segmented pixel with 20 bits. In the concrete case with M=16, N=4 and by taking the reduction from 20 bits to 16 bits into account, a higher raw data rate of a counting detector by the factor 50 (~16*4*(16/20)) is thus produced with four energy thresholds and 16 sub detector pixels to a macropixel compared with a currently integrating detector system. Since the data volume to be transmitted of conventional integrating detectors represents a challenge, a corresponding problem results on account of the data quantity of quanta-counting detectors which is higher by the factor 50.

In the field of conventional, integrating detector systems, various methods of reducing data are known. Such methods can basically also be transferred to counting detector systems and in this way generate a comparable, relative data reduction, but the problem of the approximately 50 times higher data rate with quanta-counting detectors nevertheless remains unresolved here.

It is known with counting detectors to reduce the data rate, by reducing the number of evaluated energy thresholds, thereby resulting in a proportional saving and can possibly be partially acceptable depending on each clinical scenario. Nevertheless, the advantages of the energy resolution of the quanta-counting detectors are as a result also at least partially forfeited again. Furthermore, a data reduction can already take place in the detector, by the values of the sub detector pixels present there being combined to form an overall value for the macropixel. In the extreme case, the data quantity can as a result be reduced to the quantity of a conventional system. The higher intrinsic local resolution and the spectral information of the different energy thresholds are however lost here. A data reduction through loss of information is therefore only generated by means of these measures.

SUMMARY

At least one embodiment of the invention is directed to a method for reducing and compressing the data quantity to be transmitted from quanta-detecting detectors, in which the lowest possible loss of information takes place.

Advantageous developments of the invention form the subject matter of the subordinate claims.

The inventor has identified that it is possible to significantly reduce a data volume to be transmitted comprising raw detector data without significantly impinging on the information content contained therein, by transforming the data using typical properties of the used energy spectrum and intrinsic properties of the detector. Furthermore, a targeted structuring of the information contained in the data volume and reduction of an unnecessary information content also enables the information quantity to be flexibly scaled and only the required or desired proportion to be transmitted. In the approach of at least one embodiment, at least one of the following detector-typical properties are essentially used:

a) the typical ratio of the counting rates of the different energy thresholds of the respective detector which can be determined in advance in the case of a typical incident x-ray spectrum, b) the similarities of the counting rates of the different energy thresholds of a sub detector pixel and c) the similarities of the counting rates of the sub detector pixels associated with a macropixel or another group of sub detector pixels.

Essentially each of these measures can also be used individually and also results individually in an effect. In particular a) and b) can be used in addition to or as an alternative to each other.

Re a): The ratio of the counting rates in the respective thresholds essentially depends on the pulse height spectrum of the x-rays absorbed in the sensor and on account of the pile-up also on the flow of the x-ray quanta striking the sensor. The typical behavior of this dependency can be determined approximately in advance by measurements in typical clinically relevant scenarios and can be calculated from the signal. If it is identified that a first energy range E1 indicates at most 180% of the signal level determined across the energy ranges, an upper energy range E4 by contrast of typically 40%, it is sufficient to only transmit the deviation from this expected behavior for a concrete measurement. The data width required herefor is generally below the data width without using the knowledge, so that a data reduction takes place.

Re b): The signals of the different energy thresholds are usually heavily correlated. This correlation is used by a suitable basic transformation of the measuring vector, which contains the N energy thresholds of a sub detector pixel. The result is a vector which contains a large part of the information already in the first component (e.g. the beam intensity). The further dimensions contain additional information with declining relevance, e.g. spectral beam hardening, non-linear distortions of the spectrum etc. If only the actually minimally required bit depths are selected or even completely omitted for the respective components, a significant data reduction can be achieved compared with the output vector without any significant loss of information.

A systematic method of identifying a suitable basic transformation is offered by Principal Component Analysis. This determines the dominant components from a set of test measurements generated in advance and generates the associated characteristic vectors and eigen values.

In practice, such a principle component analysis can comprise the following method steps:
  recording typical measurement data records which are relevant to the respective application. Different data records may be produced here for various clinical problems.
  implementing the principle component analysis, for instance according to http://en.wikipedia.org/wiki/Principal_component_analysis or http://de.wikipedia.org/wiki/Hauptkomponentenanalyse—on the measurement data across the entire detector used.
  identifying the components relevant to the concrete application from the results of the principle component analysis and identifying the bit width required for the application. For instance, numerical or user-related image quality evaluations can take place herefor.
  use of the transformation and discretization parameters obtained herefrom for the inventive data reduction.

Accordingly, the inventor proposes at least one embodiment of a method for reducing and compressing raw detector data to be transmitted of a quanta-counting detector having a plurality of detector pixels, each of which is subdivided into several sub detector and per sub detector pixel, at least two different energy thresholds are used for resolving the energy of the incident quanta to be counted, which comprises the following method steps:
  detecting the number of incident quanta per sub detector pixel per energy range, wherein counting patterns result by way of at least one sub detector pixel, the information content of which contains systematic information structures,
    determining at least part of the information structures in the counting patterns,
    encoding the counting patterns using bit depths compressed by comparison with the raw detector data,
    transmitting the encoded counting patterns, and
    decoding the counting patterns following the transmission.

BRIEF DESCRIPTION OF THE DRAWINGS

The invention is described in more detail below on the basis of example exemplary embodiments with the aid of the figures, wherein only the features required to understand the invention are shown: the following reference characters are used: 1: CT system; 2: first x-ray tube; 3: first detector; 4: second x-ray tube; 5 second detector; 6: gantry housing; 7: data line; 8: examination couch; 9: system axis; 10: computing unit/computer system; A: typical pulse height diagram; B: diagram of the actual measurements; C: diagram of the essential residual information; D: detector/pixel matrix; E: energy; E1-E4: energy ranges; M: macropixel; P: patient; Prg1-Prgn: computer programs; R: counting rate; R': residual information of the counting rate; S: sub detector pixel; SI: rebinning of the pixel groups; SII: hierarchical difference formation; SIII: discretization; SIV: transformation adjusted to the signal noise; SV: data transmission; Δ difference.

in which show in detail:

FIG. 1 is a representation of the data reduction by using knowledge with standardization of the measurement values to their average counting value, FIG. 2 is a representation of the data reduction by using knowledge with standardization of the measurement values to their typical counting value in each instance relative to the other channels.

DETAILED DESCRIPTION OF THE EXAMPLE EMBODIMENTS

Figure 3:
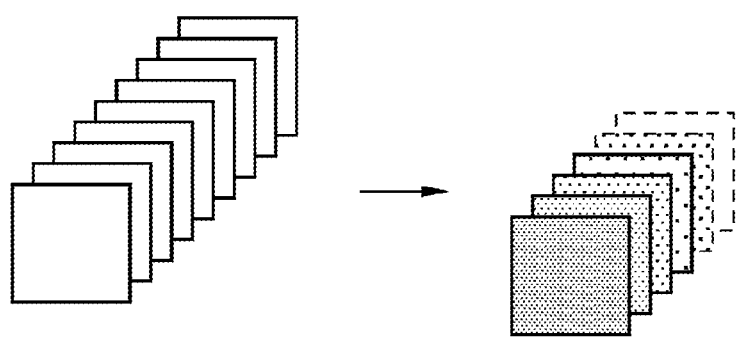
FIG. 3 is an illustration of the transformation of the measurement data in its components by means of basic transformation, wherein the resulting planes contain the pixel values of the respective components and the essential information after the transformation is found in the front components/planes so that it is possible to dispense with the transmission of the rear planes and/or components of a higher order, FIG. 4 are three example embodiments of a suitable basic transformation of measured values for bit depth-reduced data transformation according to FIG. 3.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In practice, such a principle component analysis can comprise the following method steps:

recording typical measurement data records which are relevant to the respective application. Different data records may be produced here for various clinical problems.

implementing the principle component analysis, for instance according to http://en.wikipedia.org/wiki/Principal_component_analysis or http://de.wikipedia.org/wiki/Hauptkomponentenanalyse—on the measurement data across the entire detector used.

identifying the components relevant to the concrete application from the results of the principle component analysis and identifying the bit width required for the application. For instance, numerical or user-related image quality evaluations can take place herefor.

use of the transformation and discretization parameters obtained herefrom for the inventive data reduction.

As an alternative to implementing a formal principle component analysis, a manual identification of the orders relevant to the application, variables or basic vectors, e.g. according to intensity, spectral beam hardening, spectral displacement, transformation into a dual energy material basis or to a multimaterial basis with for instance contrast agent, water, bone tissue, muscle tissue, fat, POMMA (polymethyl methacrylate) or acrylic glass, breaking down the absorption values according to the photo & Compton effect, and the accuracy thereof, may take place. A suitable selection depends on the target application and can be made by the person skilled in the art for the target application.

In practical terms, the principle component will essentially correspond to that of an average signal strength, in which the brightness fluctuations of the x-ray tube and the influence of the absorption coefficients of the currently irradiated object are reflected. The higher orders will describe the deformation of the spectrum, specified by spectral beam hardening or shortening/lengthening of the spectrum, such as for instance may be caused by changes in the electrical field in the sensor.

As an alternative to a systematic principle component break-down with the aid of measurement data, a similar concrete set of main components can instead also be selected in advance. In each case, the transformation and bit width is determined in advance, so that the computing outlay required in real-time during the data acquisition is held at realizable limits. The concrete transformation, the meaning of the components and the bit width expedient for its transmission also depend on whether the method b) is used in combination with or as an alternative to a).

Re c): The spatial signal of the sub detector pixel of a macropixel or another spatial group can be broken down in a similar manner to in b) into main and subsidiary components. Different methods are conceivable herefor. The inventive data reduction is achieved in that the common components relevant to a measurement are identified and only transmitted with the data width required in each instance.

The fundamental contribution will be the average counting rate for instance, such as would also be transmitted when combining the sub detector pixels to form a macro pixel value. Higher components then contain for instance information about the spatial gradients in ascending order and can be transmitted with an adjusted, reduced bit width. A second aspect of the invention extending beyond data reduction is the flexible, and if necessary also dynamic adjustment of the accuracy of the data to the required or available data bandwidth: in particular, all components need not necessarily be transmitted and it may be meaningful to dispense with components with effects of a higher order or to transmit them in a declining order only to the degree to which the bandwidth allows it.

Compared with the transmission of all sub detector pixel values, this method is advantageous in terms of a lower data bandwidth, compared with transmission only of the macro pixel value, at least one embodiment of the method is advantageous in that the higher spatial resolution can only be used in very moderate growth of the data volume.

A not insignificant step of at least one embodiment of the inventive method lies in this case in identifying the redundancies in the signal of the quanta-counting x-ray detectors with several energy thresholds and in the derivation of methods with which these redundancies can be used to solve the data volume problem.

Such methods are suited to a technical realization, since they reduce the computing outlay required in real-time to a minimum by essentially using the linear transformation of the measurement data vectors, which can be parallelized to a high degree. Furthermore, the required parameters can already be determined in advance, also using a correspondingly large computing outlay. In this way, the scope of the used look-up tables can also be optimized in accordance with cost/benefit/outlay criteria.

The application of at least one embodiment of the invention further enables the scalable use of the essential information relating to a quanta-counting detector having a fraction of the data volume which was required herefor in accordance with the current status.

Accordingly, the inventor proposes at least one embodiment of a method for reducing and compressing raw detector data to be transmitted of a quanta-counting detector having a plurality of detector pixels, each of which is subdivided into several sub detector and per sub detector pixel, at least two different energy thresholds are used for resolving the energy of the incident quanta to be counted, which comprises the following method steps:

detecting the number of incident quanta per sub detector pixel per energy range, wherein counting patterns result by way of at least one sub detector pixel, the information content of which contains systematic information structures, determining at least part of the information structures in the counting patterns, encoding the counting patterns using bit depths compressed by comparison with the raw detector data, transmitting the encoded counting patterns, and decoding the counting patterns following the transmission.

According to the above-described embodiments under a) to c), at least a proportion of the encoded and thus compressed information structures can contain already known information and/or typical energy distribution patterns and/or spatial intensity distribution patterns.

A basic transformation of the measured data can advantageously be embodied in order to determine the counting pattern, wherein a set of predetermined characteristic vectors and eigen values can advantageously be used for the basic transformation.

Furthermore, a principle component analysis can be embodied, wherein, using test measurements, dominant components are determined and the associated characteristic vectors and eigen values are determined.

In one particular embodiment of the inventive method, a bit depth depending on the signal-to-noise ratio of the measurements is also used for the encoded counting pattern.

In addition, when the counting pattern is encoded, the data resulting therefrom is arranged hierarchically in accordance with its spatial and/or energetic resolution. It is then possible to transmit the data arranged hierarchically according to the resolution for a predetermined time frame of the measurements such that firstly data relating to a low resolution and subsequently data resolution to a higher resolution are transmitted. Alternatively, when a predetermined or resulting time limit is reached, it is possible to dispense with the transmission of data with a higher resolution.

It is also proposed to perform a dynamic adjustment of the order of the transmitted data to an available bandwidth of a transmission path. The maximum possible information quantity is transferred herethrough in each instance, data congestion on account of an excessively high data density is however prevented. Alternatively, only the part of the data from the encoded counting patterns essential to the respective application can also be transmitted. This means that a decision is made prior to the data transmission as to which part of the information generated by the detector is essential to the application developing thereupon and information content extending therebeyond is already removed from the data flow upstream of the data transmission path to be negotiated.

In addition to at least one embodiment of the inventive method, the inventor also proposes a CT system having at least one quanta-counting detector, a computer system and a data transmission path between the detector and computer system, wherein programs executed during operation are stored in the computer system, the programs mapping the method steps of at least one embodiment of the inventive method.

FIGS. 1 and 2 show example representations of the data reduction by using prior knowledge, wherein the counting rate R is plotted against the energy E in the diagrams A and B and in diagram C, the residual information of the counting rate R remaining after the data reduction is plotted against the energy E in each instance for four energy ranges. The lines drawn roughly horizontally represent the average value of the counting rate in each instance, while the curve of the counting rate over the energy is shown as a dashed line.

FIG. 1 shows a simple example of the encoding of typical energy range counting in a quanta-counting detector. Three diagrams are shown one above the other, each of which show the number of incident quanta in the respective energy ranges for four energy ranges E1 to E4. A diagram A is shown first at the top, which shows the typical pulse height spectrum of a quanta-counting detector element in the respectively present measurement configuration of a CT system, in other words the knowledge. The dashed horizontal line graphically represents the average value of the pulse height. Accordingly, averaged in respect of an average number of 100% quanta per energy range over all energy ranges, the percentage number of quanta is shown in the respective energy range in the form of a typical information structure. In other words 180% in range E1, 120% in range E2, 60% in range E3 and 40% in range E4.

In the central diagram B, an actual measurement is shown for a pixel, in which the quanta at the energy range are currently distributed as follows: 190% in range E1, 140% in range E2, 50% in range E3 and 20% in range E4. A deviation from the typical energy distribution in % points therefore results for each energy range, as is described in the lower diagram C, with the following deviations: +10% in range E1, +20% in range E2, −10% in range E3 and −20% in range E4.

It is now herewith inventively possible, on account of the encoding used here, for only the deviation of the measured values compared with the typical distribution in the form of deviation factors to have to be transmitted and these % point deviations in these bit depths being lower than the actual measured values, to achieve a saving in terms of the data to be transmitted. The term bit depth is understand in the description to mean the "depth" of a data word, e.g. with 8, 10, 12, 16 or 24 bits. Alternatively, the term bit depth stands for the digital resolution of a data transmission. The diagram C therefore contains the essential residual information standardized to the average value of the measurements.

Alternatively to the method shown in FIG. 1, FIG. 2 shows a variant in which the standardization is not related to the average value of the measurement across the energy ranges but instead to the typical measured value of the count per energy range. These typical measured values are shown, in other words the prior knowledge, again in the upper diagram A with exemplary 1800 counts in the energy range E1, 1200 counts in the energy range E2, 600 counts in the energy range E3 and 400 counts in the energy range E4, wherein 1000 counts correspond to 100%. The central diagram B again shows the measured values according to FIG. 1. Accordingly in the lower diagram C, the encoded measured values result in deviations from the respectively typical measured values in the energy range with +5.6% in the energy range E1, +16.7% counts in the energy range E2, −16.7% in the energy range E3 and −50% counts in the energy range E4. The count values to be transmitted are also significantly smaller here than the raw data, so this data can be transmitted with a reduced bit depth without the loss of information.

To describe this prior knowledge used here, a look-up table is practical, which contains the expected ratios of the thresholds relative to one another for a concrete input spectrum and a concrete set of energy thresholds. Depending on the embodiment, this table can be extended by dimensions for tube current intensities, average counting rates, attenuation in the mm depth of water, channel position (e.g. with wedge filters) etc. The concrete scope of the look-up table can be optimized in advance in accordance with cost/benefit/outlay criteria.

Alternatively, a functional description of the typical behavior also lends itself hereto in terms of how it can be determined for instance by a polynomial fit to the data of the look-up tables.

The selection of the standardization of the measured counting rates can be configured differently, for instance, the data can relate to the average counting rate or also to the counting rate of a specific threshold, e.g. to a selected energy range. If the average counting rate is used for the standardization, this must either be transferred separately or it may appear in combination with b) as a principle component. The main similarity of the count values of the different energy ranges lies in the radiation intensity. Therefore the relationship with b) therefore naturally results here. In the latter case, the significance of the next highest component would change and the data bandwidth required for its representation would reduce if necessary. The deviation of the respective count value from the typical behavior can alternatively be considered relative to the standardization variable or relative to the typical standardized value of this threshold.

FIG. 3 shows a rough schematic representation of a significant aspect of the invention of a transformation of measured values in different energy thresholds of a detector, to the left, in a set of components describing the counting rate spectrum, to the right. The planes on the left side correspond to those in count values of the pixel of the detector matrix (raw data) shown in an energy threshold in each instance. The planes on the right side correspond to the sums of the respective components (according to FIG. 4) in the pixels of the detector matrix. In this case the counting rates measured in the respective pixels with the different energy thresholds are in analyzed and transformed such that data records arranged therefrom result, which have a development of the counting rate spectrum in ever increasing consecutive amounts. For instance, the spatial distribution of the average counting rates may exist in a data record of the first order (front plane), the second order (second plane) may contain the spatial distribution of the increase of a linear approximation of the counting rate spectrum and the rear planes the spatial distributions of the components of a higher order. As a result, such a method enables the data to be adjusted transmission in each instance to the available bandwidth of a transmission path and if necessary only the essential parts of the present measurement to be transmitted.

Figure 4:
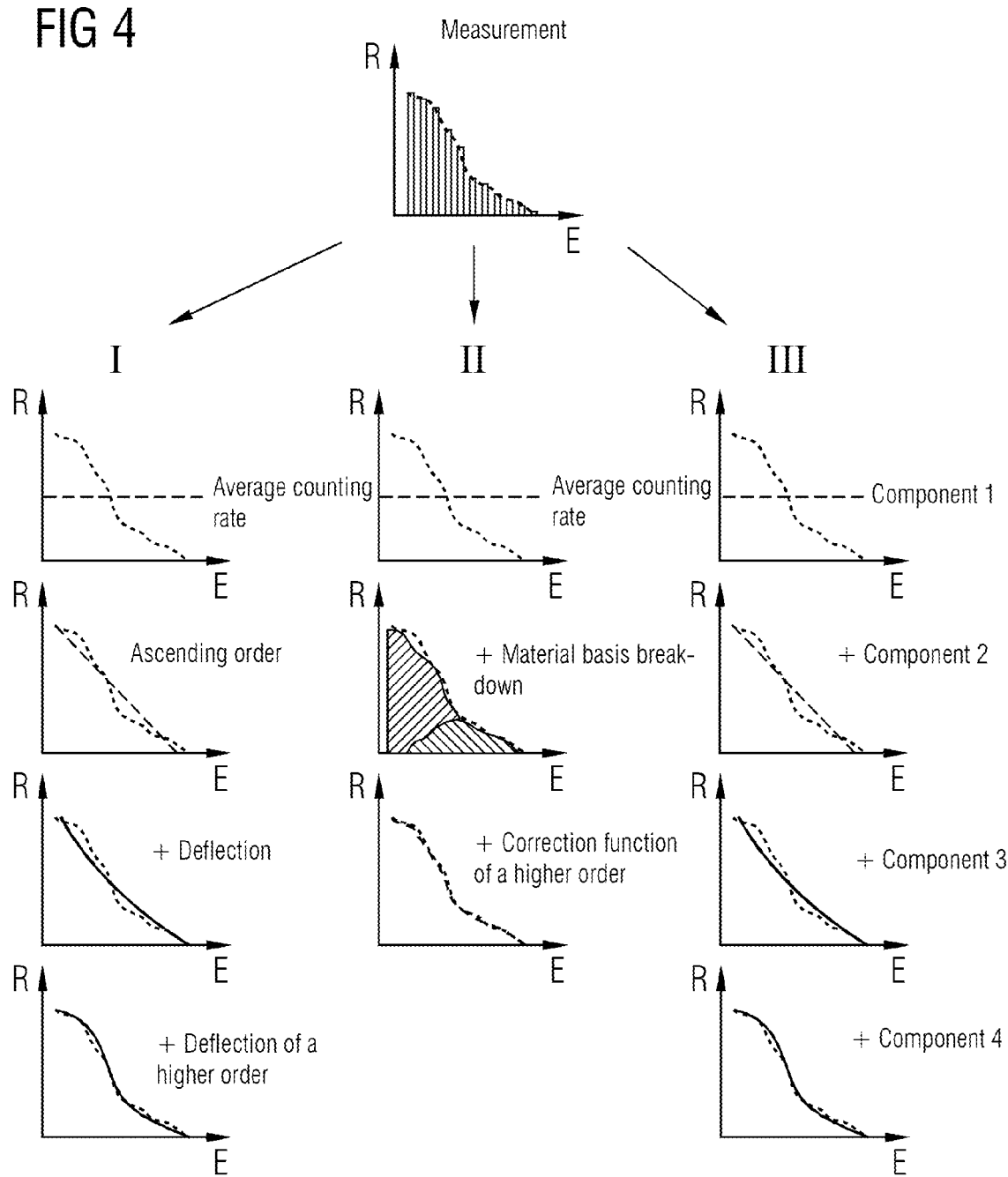

FIG. 4 shows three different variants I-III of transformations, such as a typical information structure present in the measured data of a counting detector, here the pulse height distribution across the energy ranges, without prior knowledge (I, III) or with prior knowledge (II) being broken down by a basic transformation into its components and can then be transmitted with significantly lower bit depths by comparison with the original measurements.

A current measurement of a pulse height distribution of a pixel is shown above with eight measured values. This measurement generates a counting rate spectrum, as shown above in variant I as the first diagram. The horizontal, dashed average value of the counts can then be determined from the measured values, which approximately represents the existing photon flow. This is the first component. The linear increase in the counting rate curve has additionally been determined hereby. The representation based on the first two components is therefore shown, as a result of which the core information of the measurement may already have been shown. Additionally included is the deflection of the 1st order of the increase (3rd component) and additionally below this the deflection of the higher order, as a result of which the pulse height curve is described increasingly more accurately. Ever greater information which describes the actual measured values is always better collected from top down in an ascending order. Accordingly, the information can be transmitted, adjusted to the requirements of a respective application, said information not necessarily being required for the respective application.

In the variant II, the counting rate spectrum is likewise detected as an original measurement, and this, advancing downwards, is broken down into various components. The first component is also the average counting rate here. The components of a higher order nevertheless in this instance achieve a break down into a selected basis of two or more different materials. In components of a higher order, deflections extending therebeyond are optionally detected. With a suitable selection of the material basis, the measured spectrum is already adequately described by the average counting rate and the component of the material basis break-down so that a strong reduction in the bit depth takes place. This variant is also advantageous in that the transmitted components already exhibit a physical significance which is potentially useful for diagnostic purposes.

A mathematical principle component analysis of components 1 to 4 is finally shown schematically in variant III, wherein the only bit depth corresponding to the desired information depth must also be transmitted here.

In the evaluation and/or decoding of the transmitted data, the prior knowledge known in advance and used for the encoding of the data is incorporated again so that after decoding, the largely complete bandwidth of the detector information is present.

Figure 5:
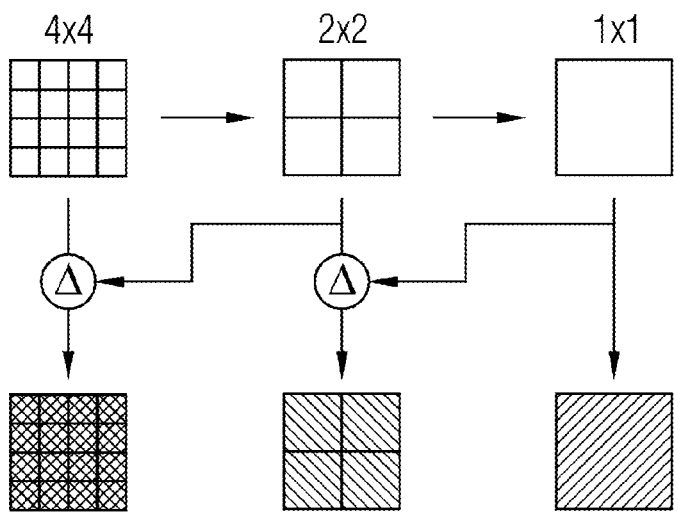
FIG. 5 shows a schematic representation of the hierarchical difference formation.

An example of a restructuring of spatial information structures is shown in FIG. 5. Here shown schematically is how the structure of a macropixel with 4×4 sub detector pixels reduces from top left to right proceeding initially across the average value formation or totaling of 2×2 pixel groups initially on a 2×2 pixel matrix and then to a 1×1 pixel according to a 1st order of the information depth. Finally, the deviations relative to the average value of the respectively lower order are calculated with A. A hierarchical data structure is therefore produced here with data records, which each provide ever deeper information, here in respect of its spatial information, relative to the originally measured data and in this process generate only the absolutely necessary data flow when transmitting the individual hierarchy stages in each instance.

Figure 6:
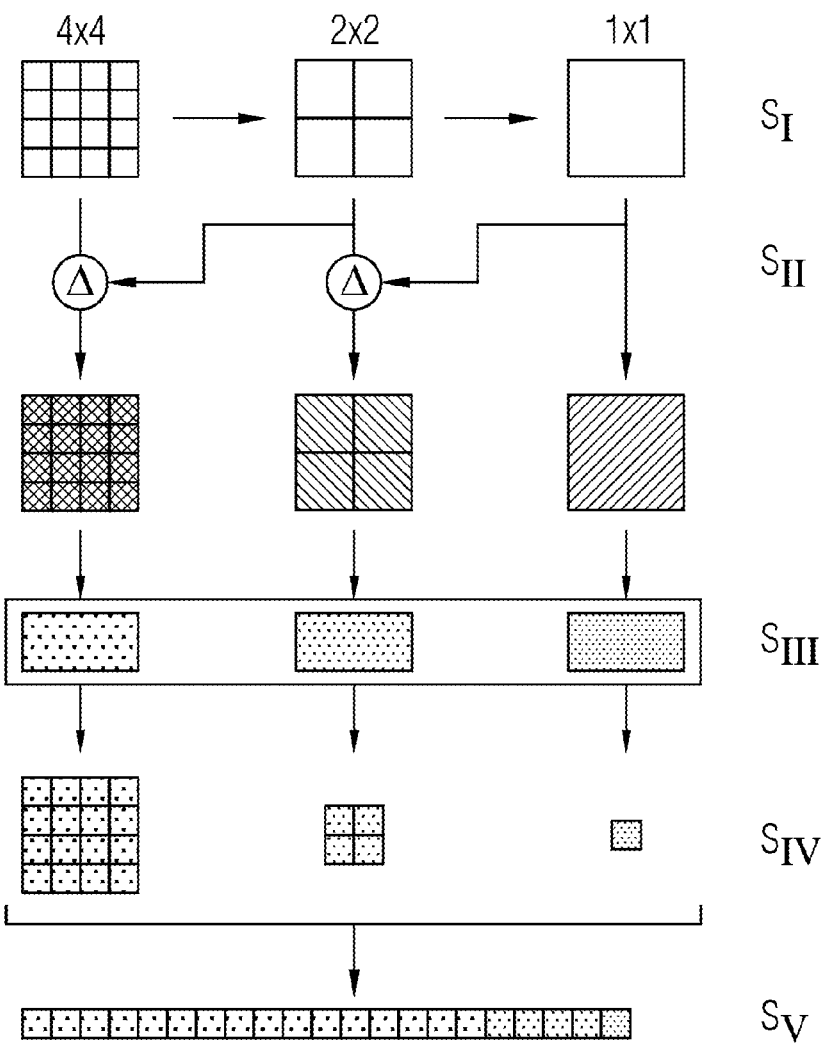
FIG. 6 shows a schematic representation of an inventive data compression by hierarchical difference formation, data compression by discretization after a transformation adjusted to the signal noise and transmission in ascending order.

A further reduction in the data flow can be achieved in that, as shown in FIG. 6 with the steps SI to SV, in addition to the data compressing by rebinning of pixel groups SI and hierarchical differential formation SII, as already shown and described in FIG. 5, a further data compression now takes place by discretization SIII following a transformation SIV adjusted to the signal noise. With this transformation, the existing, high count values are reduced in a factorial manner from the counter events of the detector elements of the summarized pixel to such a degree that finally the distinguishable count differences lie in the range of uncertainty of noise. Since the points in time of the occurrence of the counter events are randomly distributed, the noise of a measurement is somewhat proportional to the root of the measured count value. The noise of the previously determined differential value is therefore proportional to the root of the average value of the observed pixel group. A suitable transformation with above-cited properties is therefore the scaling of the differential values with a factor which is adjusted to the increase in the square root function in the region of the average counting rate of this pixel group. The discretization accuracy relative to the noise can be adjusted by a further multiplication with a constant factor prior to use of the discretization step. As a result, the absolute count values reduce drastically compared with the non-transformed count values and thus also the bit depth of the data to be transmitted. With the subsequent transmission of a plurality of pixels, the now existing count values are additionally restructured again in respect of their value, so that a hierarchical order develops here and a transmission SV of the data can take place in ascending order.

In respect of the afore-cited similarities of the different energy thresholds of a sub detector pixel, the transformation of the counting rate measurements of the individual sub detector pixels in the principle components offers various embodiment possibilities and can optionally be implemented with or without assessing the prior knowledge. In general, those characteristic vectors which indicate the greatest influence on the measured distribution and thus typically carry the majority of the information can be identified in a principle component analysis with the aid of a measured data record in sequence.

The principle component will typically correspond to the average counting rate and the higher orders the shape of the spectrum of if previously known knowledge is used, will describe its deformation. As an alternative to a systematic analysis of the components, a practical break-down can also be selected for the transformation, e.g. according to spectral beam hardening or according to material bases which may be advantageous for the interpretation of the data and its further evaluation in subsequent processing steps, e.g. a CT reconstruction.

The order of the transmitted components and the respective bit depth can be optimized if required and may also be different depending on the mode of the measurement.

If similarities of the sub detector pixel associated with a macropixel or another group of sub detector pixels are used, similar freedoms to the similarities of the different energy thresholds of a sub detector pixel also exist in the spatial break-down into principle components. It is relevant to the invention for the break-down to separate dominant components from less dominant components and for the respective components to be transmitted with a data depth suited thereto or also not to be transmitted at all.

The break-down according to selectable basic functions is generally suited hereto. The following alternatives are practical for instance:

Break-down according to ever finer subgroups in the manner of a "Quad-Tree" tree structure, such as is described for instance in "http://en.wikipedia.org/wiki/File:Quad_tree_bitmap.svg". The first component would in this case be the average counting rate of the macropixel. The improvement would subsequently depend on the respective average values of the respective quadrants, followed by the respective improvements to the sub quadrants etc. Each hierarchy stage needs in this case only to encode the deviation from the average value of the higher node so that the entire data quantity can be better reduced, the stronger the spatial correlation of the signals of the sub detector pixel is. This break-down is advantageous on account of the simple scaling and apparent significance of the components. The macropixel data is initially obtained, followed by even further improvements down to the sub detector pixel resolution.

Further alternatives lie in the used break-downs according to local frequencies with an ascending order, for instance according to the average counting rate, the gradients in the phi and z-direction etc., according to the type of discrete Fourier transformation or a type of wavelet break-down. It is advantageous if the break-down can be shown as a linear transformation, so that it can be calculated by the simple multiplication of the sub detector pixel vector with the transformation matrix. Even if the summary of the sub detector pixel of a macropixel is particularly favorable, larger or smaller groups of sub detector pixels can alternatively also be combined. Similarly, a combination with the possibly already existing compression method may also be meaningful.

If several of the afore-cited variants are used, it may be advantageous for the individual transformations to be combined to form an overall transformation in order to simplify the calculation. This transforms the measured vector of all thresholds in all sub detector pixels into a target vector, which is then transmitted with a component-specific bit depth.

A simple example of such a transformation is the mapping of the sub detector pixel data onto a scalable overall measured value, which shows itself as a weighted sum of the sub detector pixel average values of the individual energy thresholds. Provision can further advantageously be made for the accuracy of the calculation to be adjusted to the finally transmitted accuracy of the respective component.

A further advantageous embodiment of the method may apply a data transformation deliberately to individual components. In particular, components which essentially bear the information of a counting rate, can profit herefrom. With components with a different type of information content (e.g. spectral beam hardening), it may conversely be advantageous not to apply such a data transformation in order to avoid a loss of information.

Figure 7:
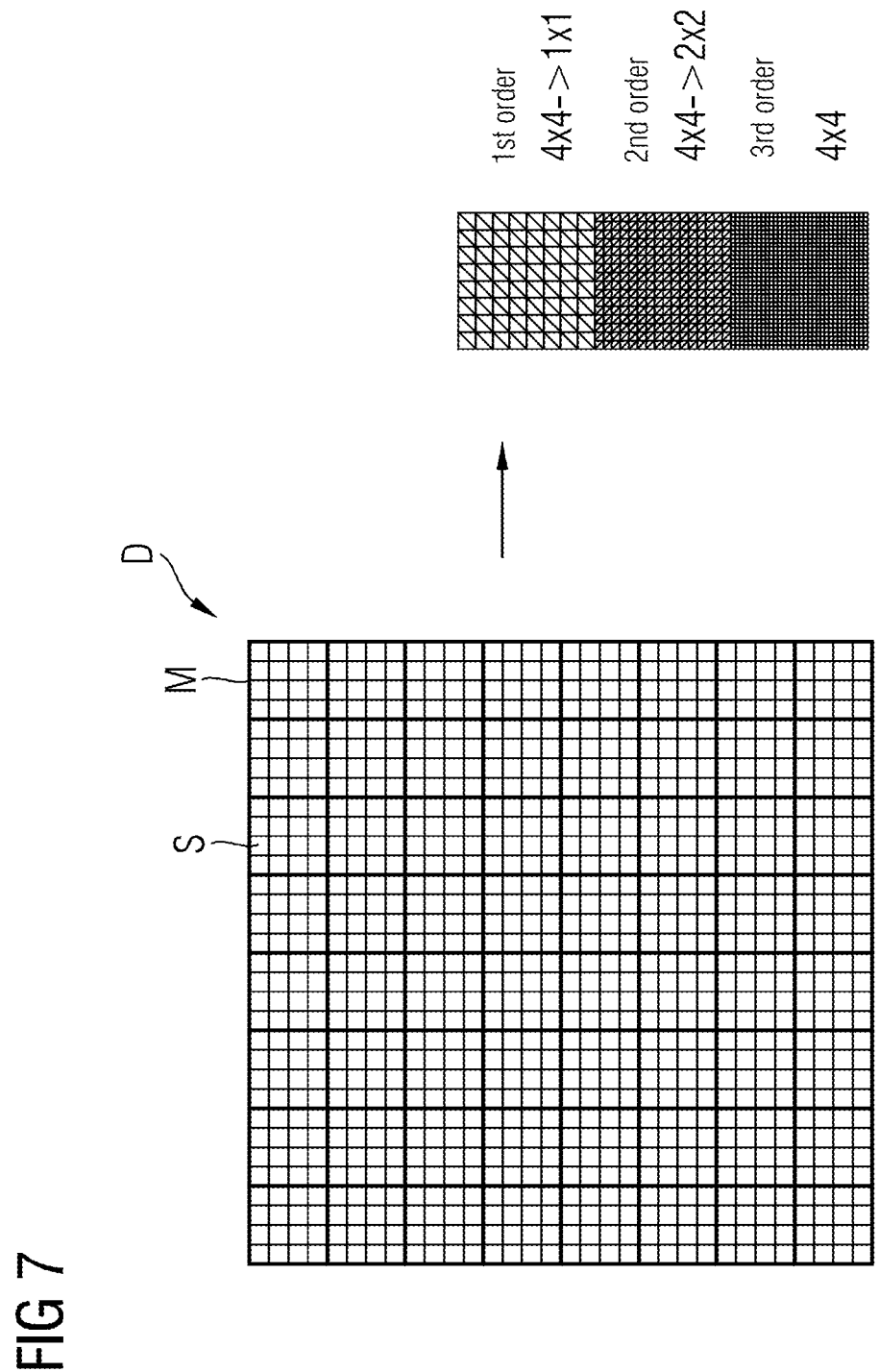
FIG. 7 shows a schematic representation of the restructuring and transformation of the raw detector data and FIG. 8 shows a CT system for executing an embodiment of the inventive method.

FIG. 7 shows a schematic representation of the restructuring and transformation of the raw data from a pixel matrix D of a counting detector comprising a plurality of adjacently arranged macropixels M, which are each configured from 4×4 sub detector pixels S. The transformation initially transforms the data into a data record of the 1st order, in which the information found in a 4×4 pixel cluster is combined into a 1×1 structure. The data quantity disposed therein is also relevant. The 2nd order then follows, in which a smaller space division with a 2×2 structure, wherein only the differences in respect of the data in the 1×1 structure are however contained herein. The data of the 3rd order finally follows with the repeated improvement in the local resolution to a 4×4 matrix, which corresponds here to the resolution of the detector. The hierarchical transmission of this transformed and restructured data records allows for a data transmission, which is exclusively restricted to the essential and/or necessary information content.

Figure 8:
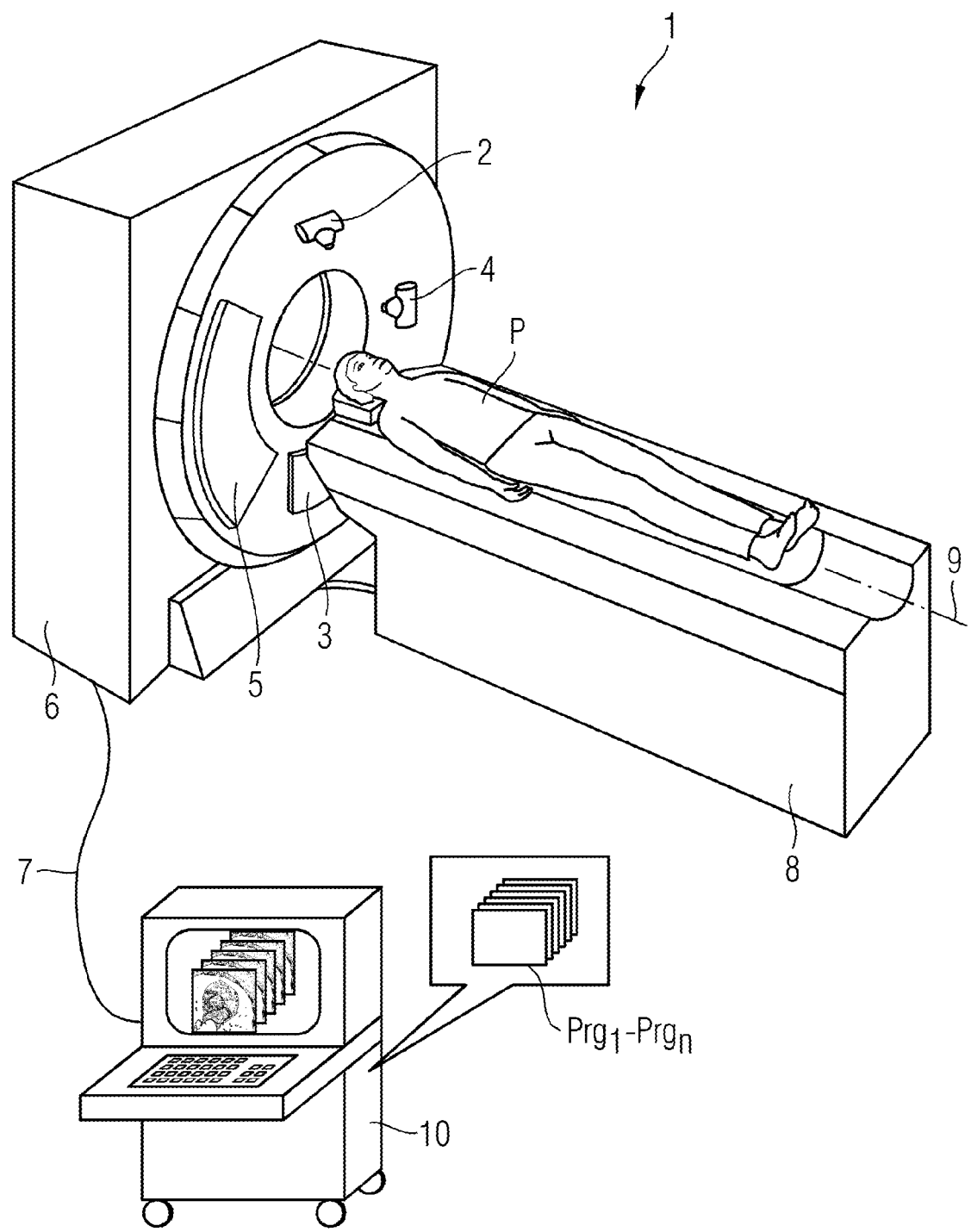

FIG. 8 shows by way of an example a CT system 1 with counting detectors, the raw data of which can be transmitted in accordance with the above-described method between detector and computing system. The CT system 1 has a first tube/detector system with an x-ray tube 2 and an opposing quanta-counting detector 3. Optionally this CT system 1 can have a second x-ray tube 4 with an opposing second quanta-counting detector 5. Both tube/detector systems are disposed on a gantry, which is arranged in a gantry housing 6 and rotates during the scanning about a system axis 9. The transmission of data from the detector takes place here by way of a loop ring system (not described in more detail here) but generally known and the data line 7 to the computing unit 10. The patient P is disposed on a displaceable examination couch 8, which is either moved continuously or sequentially along the z-axis or system axis 9 through the scanning field disposed in the gantry housing 6, wherein the attenuation of the x-ray radiation emitted by the x-ray tubes in the form of a photon flow is measured by the counting detectors. Here the photon flows arriving at the detector pixels are divided in each instance according to the energy ranges of the impacting photons. Large increases in the data volume to be transmitted herewith result by comparison with the conventional integrating detectors. The above-described inventive method is to be helpful in the transmission of these large data flows.

The CT system 1 is controlled and also an embodiment of the inventive method is implemented with the aid of a computing unit 10, in which corresponding computer programs Prg1 to Prgn are disposed. In addition, a corresponding, not shown in further detail here, computing system on the detector side is required, which compresses the incident raw data of the detector or the detectors in an inventive manner and sends the same to the transmission path.

Reference is made here to a C-arm system with a counting detector being included in the group of CT systems mentioned here within the meaning of embodiments of the invention.

Overall, a method for reducing and compressing raw detector data to be transmitted of a quanta-counting detector is proposed with an embodiment of the invention, wherein count patterns are determined in the raw detector data, encoded with a bit depth reduced by comparison with the raw detector data, the encoded count pattern are transmitted and decoded following the count pattern. An embodiment of the invention also includes a data transmission path between a quanta-counting detector and a computer system, wherein program segments/modules are provided, which execute the afore-cited method steps during operation and a CT system with such a data transmission path.

Although the invention was illustrated and described in more detail by the preferred exemplary embodiment, the invention is not restricted by the disclosed examples and other variations can be derived herefrom by the person skilled in the art without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for encoding data of a quanta-counting detector including a plurality of detector pixels of a detector, each subdivided into several sub detector pixels, and per sub detector pixel, at least two different energy thresholds being usable to resolve energy of the counting incident quanta, the method comprising:
    detecting a number of incident quanta per sub detector pixel per energy range, wherein count patterns appear across at least one of the sub detector pixels, information content of the count patterns containing systematic information structures;
    encoding at least one of the count patterns with a bit depth, reduced by comparison with the raw detector data, the encoding including use of properties of an energy spectrum of the energy range and intrinsic properties of the detector, and the encoded at least one of the count patterns including energy distribution patterns; and
    transmitting the encoded at least one count pattern,
    the at least one count pattern being determinable following the transmission.

2. The method of claim 1, wherein at least a proportion of the encoded at least one count pattern includes known or typical information.

3. The method of claim 2, wherein a basic transformation executable to determine the at least one count pattern.

4. The method of claim 3, wherein a set of eigen vectors and eigen values are determined and used for the basic transformation by way of a principle component analysis using test measurements.

5. The method of claim 4, wherein the bit depth used for encoding the at least one count pattern is dependent on a signal-to-noise ratio of the test measurements.

6. The method of claim 1, wherein the at least one count pattern is encoded, and data resulting therefrom is assigned in a hierarchical manner in accordance with at least one of its spatial and energetic resolution.

7. The method of claim 6, wherein the data ordered in a hierarchical fashion in accordance with the resolution, is transmitted for a period of time such that data relating to a relatively low resolution is transmitted first and data relating to a relatively higher resolution is transmitted subsequently.

8. The method of claim 7, wherein, when a time limit is reached, transmission of the data with the relatively higher resolution is dispensed with.

9. The method of claim 7, wherein a dynamic adjustment of the order of the transmitted data is performed to an available bandwidth of a transmission path.

10. The method of claim 7, wherein only a significant part of the data from the at least one encoded count pattern is transmitted.

11. The method of claim 8, wherein an order and resolution of the transmitted data is selected as a function of the planned examination.

12. A system between a quanta-counting detector divided spatially into a plurality of pixels, and a computer system for processing transmitted detector data, the system comprising at least one programmable processor, embodied to execute the method of claim 1 during operation.

13. A CT-System comprising:
    at least one quanta-counting detector; and
    a computer system,
    the computer system including programs stored therein which, when executed during operation of the computer system, reproduce the method of claim 1.

14. A non-transitory computer readable medium including program segments for, when executed on a division surface determination system, causing the division surface determination system to implement the method of claim 1.

15. The method of claim 1, wherein at least one of the following intrinsic properties of the detector are used:
    a) a ratio of counting rates of different energy thresholds of the detector,
    b) similarities of the counting rates of the different energy thresholds of a sub detector pixel, and
    c) similarities of the counting rates of the sub detector pixels associated with a macropixel or another group of sub detector pixels.

16. The method of claim 1, wherein the energy distribution patterns are known or typical energy distribution patterns.

17. The method of claim 1, wherein the bit depth, reduced by comparison with the raw detector data, includes a deviation of measured values compared with a typical distribution in the form of deviation factors.

18. A method for encoding data of a quanta-counting detector including a plurality of detector pixels each subdivided into several sub detect pixels, and per sub detector pixel, at least two different energy thresholds being usable to resolve energy of the counting incident quanta, comprising:
    detecting a number of incident quanta per sub detector pixel per energy range, wherein count patterns appear across at least one of the sub detector pixels, information content of the count patterns containing systematic information structures;
    encoding at least one of the count patterns with a bit depth, reduced by comparison with the raw detector data; and
    transmitting the encoded at least one count pattern, the at least one encoded count pattern being determinable following the transmission, the encoded at least one of the count patterns including known or typical information, wherein a basic transformation is executable to determine the at least one count pattern and wherein a set of eigen vectors and eigen values are used for the basic transformation.

19. The method of claim 18, wherein at least a proportion of the encoded at least one count pattern includes energy distribution patterns.

20. The method of claim 18, wherein at least a proportion of the encoded at least one count pattern includes spatial intensity distribution patterns.

21. A CT-System comprising:
    at least one quanta-counting detector; and
    a computer system, the computer system including programs stored therein which, when executed during operation of the computer system, reproduce the method of claim 18.

22. The method of claim 18, wherein the at least one count pattern is encoded, and data resulting therefrom is assigned in a hierarchical manner in accordance with at least one of its spatial and energetic resolution.

23. The method of claim 22, wherein the data, ordered in a hierarchical fashion in accordance with the resolution, is transmitted for a period of time such that data relating to a relatively low resolution is transmitted first and data relating to a relatively higher resolution is transmitted subsequently.

24. The method of claim 23, wherein, when a time limit is reached, transmission of the data with the relatively higher resolution is dispensed with.

25. The method of claim 23, wherein a dynamic adjustment of the order of the transmitted data is performed to an available bandwidth of a transmission path.

26. The method of claim 23, wherein only a significant part of the data from the at least one encoded count pattern is transmitted.

27. The method of claim 24, wherein an order and resolution of the transmitted data is selected as a function of the planned examination.

28. A system between a quanta-counting detector divided spatially into a plurality of pixels, and a computer system for processing transmitted detector data, the system comprising:
    at least one programmable processor, embodied to execute the method of claim 18 during operation.

29. A non-transitory computer readable medium including program segments for, when executed on a division surface determination system, causing the division surface determination system to implement the method of claim 18.

30. The method of claim 18, wherein the encoding includes use of properties of an energy spectrum of the energy range and intrinsic properties of the detector and wherein at least one of the following intrinsic properties of the detector are used:
    a) a ratio of counting rates of different energy thresholds of the detector,
    b) similarities of the counting rates of the different energy thresholds of a sub detector pixel, and
    c) similarities of the counting rates of the sub detector pixels associated with a macropixel or another group of sub detector pixels.

31. The method of claim 18, wherein the bit depth, reduced by comparison with the raw detector data, includes a deviation of measured values compared with a typical distribution in the form of deviation factors.

* * * * *